(12) United States Patent
Duncan et al.

(10) Patent No.: US 10,953,706 B2
(45) Date of Patent: Mar. 23, 2021

(54) AIR STORAGE SYSTEM FOR RAPID TIRE INFLATION

(71) Applicant: Bridgestone Americas Tire Operations, LLC, Nashville, TN (US)

(72) Inventors: Anthony B. Duncan, Wadsworth, OH (US); Sergio A. Botello, Del Rio, TX (US)

(73) Assignee: Bridgestone Americas Tire Operations, LLC, Nashville, TN (US)

(*) Notice: Subject to any disclaimer, the term of this patent is extended or adjusted under 35 U.S.C. 154(b) by 421 days.

(21) Appl. No.: 16/063,739

(22) PCT Filed: Dec. 6, 2016

(86) PCT No.: PCT/US2016/065112
§ 371 (c)(1),
(2) Date: Jun. 19, 2018

(87) PCT Pub. No.: WO2017/116626
PCT Pub. Date: Jul. 6, 2017

(65) Prior Publication Data
US 2020/0269638 A1  Aug. 27, 2020

Related U.S. Application Data

(60) Provisional application No. 62/272,162, filed on Dec. 29, 2015.

(51) Int. Cl.
*B60C 23/00* (2006.01)
*B60C 23/10* (2006.01)
*B60C 23/16* (2006.01)

(52) U.S. Cl.
CPC .. *B60C 23/00372* (2020.05); *B60C 23/00354* (2020.05); *B60C 23/10* (2013.01); *B60C 23/16* (2013.01); *B60C 2200/08* (2013.01)

(58) Field of Classification Search
CPC .............. B60C 23/001; B60C 23/003; B60C 23/00305; B60C 23/00309;
(Continued)

(56) References Cited

U.S. PATENT DOCUMENTS

| | | |
|---|---|---|
| 2,634,783 A | 4/1953 | Turek |
| 4,470,506 A | 9/1984 | Goodell et al. |

(Continued)

FOREIGN PATENT DOCUMENTS

| | | |
|---|---|---|
| DE | 3308080 | 9/1984 |
| DE | 4014379 | 11/1991 |

(Continued)

OTHER PUBLICATIONS

Machine translation of W)2013178568 filed on Dec. 5, 2013 owned by Ptg Reifendruckregelsysteme Gmbh.

(Continued)

*Primary Examiner* — Jason R Bellinger

(57) ABSTRACT

A tire inflation system is provided for a vehicle supported by a plurality of inflatable tires. The system includes a compressor, a main air storage tank and an auxiliary air storage tank. An automated shut off valve is disposed between the main air storage tank and the auxiliary air storage tank. An inflation sensor is arranged to detect an inflation pressure provided to the tires. A controller has a rapid inflation mode configured to initially communicate stored compressed air from both the main air storage tank and the auxiliary air storage tank to the tire or tires being inflated, and to then close the automated shut off valve so that additional compressed air from the compressor is communicated to the tire or tires being inflated without repressurizing the auxiliary air storage tank.

20 Claims, 5 Drawing Sheets

(58) Field of Classification Search
CPC ............ B60C 23/00372; B60C 23/04; B60C 23/0408; B60C 23/10; B60C 23/16
See application file for complete search history.

(56) References Cited

U.S. PATENT DOCUMENTS

| | | | |
|---|---|---|---|
| 4,763,709 A | 8/1988 | Scholer | |
| 5,313,995 A | 5/1994 | Schultz | |
| 5,587,698 A | 12/1996 | Genna | |
| 5,629,874 A | 5/1997 | Mittal | |
| 5,647,927 A | 7/1997 | Mason | |
| 6,144,295 A | 11/2000 | Adams et al. | |
| 6,594,566 B1 | 7/2003 | Skoff | |
| 6,966,220 B2 | 11/2005 | Yueh | |
| 7,197,422 B2 | 3/2007 | Gaunt et al. | |
| 8,744,679 B2 | 6/2014 | Boss et al. | |
| 9,296,264 B2 | 3/2016 | Mozingo et al. | |
| 9,789,739 B1* | 10/2017 | Hennig | B60S 5/04 |
| 2003/0216845 A1 | 11/2003 | Williston | |
| 2003/0230342 A1 | 12/2003 | Skoff | |
| 2004/0003865 A1 | 1/2004 | Skoff | |
| 2005/0045259 A1 | 3/2005 | Hottebart | |
| 2005/0102073 A1 | 5/2005 | Ingram, II | |
| 2006/0041396 A1 | 2/2006 | Polzin | |
| 2006/0278314 A1 | 12/2006 | Skoff | |
| 2007/0044881 A1 | 3/2007 | Skoff | |
| 2011/0120611 A1 | 5/2011 | Hansen | |
| 2011/0140875 A1 | 6/2011 | Be et al. | |
| 2012/0218095 A1 | 8/2012 | Zhou | |
| 2012/0221196 A1 | 8/2012 | Seymour et al. | |
| 2013/0030658 A1 | 1/2013 | Linster | |
| 2013/0068361 A1 | 3/2013 | Flory et al. | |
| 2013/0112327 A1 | 5/2013 | Tigges | |
| 2014/0299215 A1 | 10/2014 | Moulik | |
| 2015/0068653 A1 | 3/2015 | Cis et al. | |
| 2015/0107742 A1 | 4/2015 | Knapke et al. | |
| 2015/0165846 A1 | 6/2015 | Sidders et al. | |
| 2015/0231937 A1 | 8/2015 | Holdrich et al. | |
| 2015/0258863 A1 | 9/2015 | Gillen | |
| 2019/0359014 A1* | 11/2019 | Rethmel | B60C 23/004 |
| 2020/0269639 A1* | 8/2020 | Duncan | B60C 23/003 |
| 2020/0269640 A1* | 8/2020 | Duncan | B60C 23/004 |

FOREIGN PATENT DOCUMENTS

| | | |
|---|---|---|
| DE | 10202993 | 7/2003 |
| DE | 19923070 | 7/2003 |
| EP | 1435302 A1 | 7/2004 |
| EP | 2058148 | 5/2009 |
| EP | 2078624 | 7/2009 |
| EP | 2196336 | 6/2010 |
| EP | 2548747 | 1/2013 |
| FR | 2957302 | 9/2011 |
| GB | 694475 | 7/1953 |
| GB | 2526301 A | 11/2015 |
| JP | 101 156110 A | 6/1989 |
| WO | 1989008031 | 9/1989 |
| WO | 1998001310 | 1/1998 |
| WO | 2008019824 | 2/2008 |
| WO | 2008142679 A2 | 11/2008 |
| WO | 2011001261 | 1/2011 |
| WO | 2011084462 | 7/2011 |
| WO | 2013037052 | 3/2013 |
| WO | 2013114388 | 8/2013 |
| WO | 2013178568 | 12/2013 |
| WO | 2014074491 | 5/2014 |
| WO | 2014082692 | 6/2014 |
| WO | 2015113151 | 6/2015 |

OTHER PUBLICATIONS

Machine translation of DE19923070 filed on Jul. 31, 2003 owned by Continental AG.
English machine translation of EP1435302 published on Jul. 7, 2004 owned by Wabco GMBH & Co. OHG.
Machine translation of KR10-2002-0088465A published on Nov. 29, 2002 owned by Dong Myung Cha.
Machine translation of DE4010711A1 published on Oct. 10, 1991 owned by Homeyer Ulrich Von.
Machine translation of DE202010013162U1 published on Mar. 22, 2012 owned by Temes Engineering Gmbh.
Machine translation of DE8715177U1 published on Jan. 7, 1988 owned by Karl-Hans Kromer.
achine translation of DE10202993 filed on Jul. 31, 2003 owned by Continental AG.
Machine translation of EP2548747 filed on Jan. 23, 2013-01-23 owned by Man Truck & Bus AG.
Bjorn Lach, Strategies for Automatic Tyre Inflation Pressure Control, 1997, University of the Federal Armed Forces, Hamburg, Germany.
Machine translation of DE3308080 filed on Sep. 20, 1984 owned by Robert Bosch Gmbh.
Machine translation of DE4014379 filed on Nov. 14, 1991 owned by Bayerische Motoren Werke AG.
Machine translation of EP2058148 filed on May 13, 2009 owned by Klaus Muller.
Machine translation of EP2078624 filed on Jul. 15, 2009 owned by Robert Bosch Gmbh.
Machine translation of FR2957302 filed on Sep. 16, 2001 owned by Herve Duplessy.
Machine translation of WO1989008031 filed on Sep. 8, 1989 owned by Sondertechnik Gesellschaft M.B.H.
Machine translation of WO2008019824 filed on Feb. 21, 2009 owned by Tsiberidis Konstantinos [DE].
Machine translation of WO2014082692 filed on Jun. 5, 2014 owned by Wabco Gmbh [DE].
English Machine Translation JPH01156110A.

* cited by examiner

AIR STORAGE SYSTEM FOR RAPID TIRE INFLATION

BACKGROUND OF THE INVENTION

1. Field of the Invention

The present disclosure relates generally to a method and apparatus for adjusting air pressure within a tire. More particularly, but not by way of limitation, the system provides for the rapid change between a field ready pressure and a road ready pressure for large agricultural tires when the agricultural vehicles on which the tires are used move from a field environment to a road environment and vice versa.

2. Description of the Prior Art

Large self-propelled agricultural equipment such as a tractor, combine harvester or high clearance sprayer spends most of its operational time in or around a cultivated field. As a result, the tires of the equipment are often adapted to address common concerns arising from using heavy machinery over a cultivated field. One of the common concerns is soil compaction. As large equipment travels over a given field, the soil beneath the equipment's tires will be compacted to increase in density. This soil compaction may be harmful to the production or yield of the field. As soil compaction increases, the yield will often decrease. In order to combat this problem, it is common for equipment operators to reduce the air pressure of the tires when the equipment is in the field. Experience has shown that a reduced tire air pressure can reduce the level of soil compaction in the field. As a result it can also increase the production and efficiency of the field.

While this reduced tire air pressure may be preferable in the field environment, an elevated tire pressure is still preferable when the equipment is traveling over a typical paved road. The elevated tire pressure allows each tire to roll more efficiently and achieve a higher maximum velocity. With many users being forced to transport their large agricultural equipment extended distances from one field to another, speed and efficiency during transport is important. However, the time needed to inflate or deflate a typical tire is often a hindrance to the ability to rapidly and efficiently move the agricultural equipment from the field environment to the road environment.

What is needed then is an improved tire inflation system addressing these concerns.

SUMMARY OF THE INVENTION

A tire inflation system is provided for a vehicle supported by a plurality of tires. The system includes a compressor carried on the vehicle, a main storage tank, and an auxiliary storage tank. A compressed air supply main line communicates the compressor with the main air storage tank. A compressed air supply auxiliary line communicates the auxiliary air storage tank with at least one of the compressed air supply main line and the main air storage tank. An automated shut off valve is disposed in the compressed air supply auxiliary line. An inflation air line communicates the main air storage tank with at least one of the tires. An inflation pressure sensor is arranged to detect an inflation pressure provided to the at least one of the tires. A controller has a rapid inflation mode configured to initially communicate stored compressed air from both the main air storage tank and the auxiliary air storage tank to the at least one of the tires, and to then close the automated shut off valve so that additional compressed air from the compressor is communicated to the at least one of the tires without repressurizing the auxiliary air storage tank.

In another embodiment a method of rapid inflation of a pneumatic tire of a vehicle is provided, the method comprising:

(a) providing on the vehicle a compressed air tank system for storing compressed air, the tank system defining a storage volume;

(b) providing on the vehicle an air compressor;

(c) storing compressed air from the compressor in the tank system at a storage pressure;

(d) increasing an inflation pressure of at least one of the tires from an initial tire inflation pressure to an intermediate tire inflation pressure by communicating the tank system with the at least one of the tires; and (e) further increasing the inflation pressure of the at least one of the tires from the intermediate tire inflation pressure to a final tire inflation pressure with additional air from the compressor while isolating at least a portion of the storage volume of the tank system from communication with the compressor.

The rapid inflation mode of the controller may be configured such that the automated shut off valve closes after pressure in the main air storage tank and the at least one of the tires substantially equalizes.

The inflation pressure sensor may be communicated with the main air storage tank.

The system may further include an automated fill valve disposed in the inflation air line, and the rapid inflation mode of the controller may be further configured such that the automated fill valve is open to communicate the main air storage tank with the at least one of the tires.

The system may further include at least one automated dump valve communicated with the air inflation line, the at least one dump valve having an open position in which the at least one of the tires is vented to decrease inflation pressure.

The system may further include at least one automated three-way valve disposed in the inflation air line. The at least one three-way valve may have an open position in which compressed air is communicated from the main air storage tank to the at least one of the tires to increase inflation pressure in the at least one of the tires, a dump position in which the at least one of the tires is vented to decrease inflation pressure in the at least one of the tires, and a blocked position in which there is no flow of air to or from the at least one of the tires through the at least one three-way valve.

The inflation pressure sensor may comprise a plurality of tire pressure sensors, one of the tire pressure sensors being disposed in each of the tires, with each tire pressure sensor configured to wirelessly transmit data. And the controller may be configured to receive the pressure data from the tire pressure sensors.

The system may further comprise a plurality of automatically operable fill valves, each of the fill valves communicating the inflation air line with a respective one of the tires. The rapid inflation mode of the controller may be a multiple tire rapid inflation mode configured to initially communicate stored compressed air from both the main air storage tank and the auxiliary air storage tank to at least two of the tires through the inflation air line and the fill valves associated with the at least two tires, and to then close the automated shut off valve while maintaining the fill valves associated with the at least two tires open so that additional compressed air from the compressor is communicated to the at least two tires without repressurizing the auxiliary air storage tank.

The rapid inflation mode of the controller may be an all tire rapid inflation mode configured to initially communicate stored compressed air from both the main air storage tank and the auxiliary air storage tank to all of the tires through the inflation air line and the fill valves, and to then close the automated shut off valve while maintaining all of the fill valves open so that additional compressed air from the compressor is communicated to all of the tires without repressurizing the auxiliary air storage tank.

The controller may include an input device configured such that a human operator can enter a low pressure setting and a high pressure setting, and the rapid inflation mode of the controller may be configured such that the automated shut off valve remains closed until the inflation pressure reaches the high pressure setting.

In any of the above embodiments, after the one or more tires has been inflated, the tires may be isolated from the tank system, and the entire storage volume of the tank system may be communicated with the compressor and repressurized to the storage pressure.

In any of the above embodiments, the storage pressure may be higher than the high inflation pressure setting, the high inflation pressure setting may be higher than the intermediate tire inflation pressure, and the intermediate tire inflation pressure may be higher than the low pressure setting.

Numerous objects features and advantages of the present invention will be readily apparent to those skilled in the art upon a reading of the following disclosure when taken in conjunction with the accompanying drawings.

DETAILED DESCRIPTION

Definitions

Following are definitions of selected terms employed herein. The definitions include various examples and/or forms of components that fall within the scope of a term and that may be used for implementation. The examples are not intended to be limiting. Both singular and plural forms of terms may be within the definitions.

"Air" is understood to mean any inflating fluid suitable for use within a tire, including, but not limited to, gases containing some amount of nitrogen or oxygen. Consequently, "air pressure" is understood to mean the fluid pressure caused at least partially by the "air" contained within a body.

"Signal" may include any meaning as may be understood by those of ordinary skill in the art, including at least an electric or magnetic representation of current, voltage, charge, temperature, data or a state of one or more memory locations as expressed on one or more transmission mediums, and generally capable of being transmitted, received, stored, compared, combined or otherwise manipulated in any equivalent manner.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or multiple components.

Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims.

Figure 1:
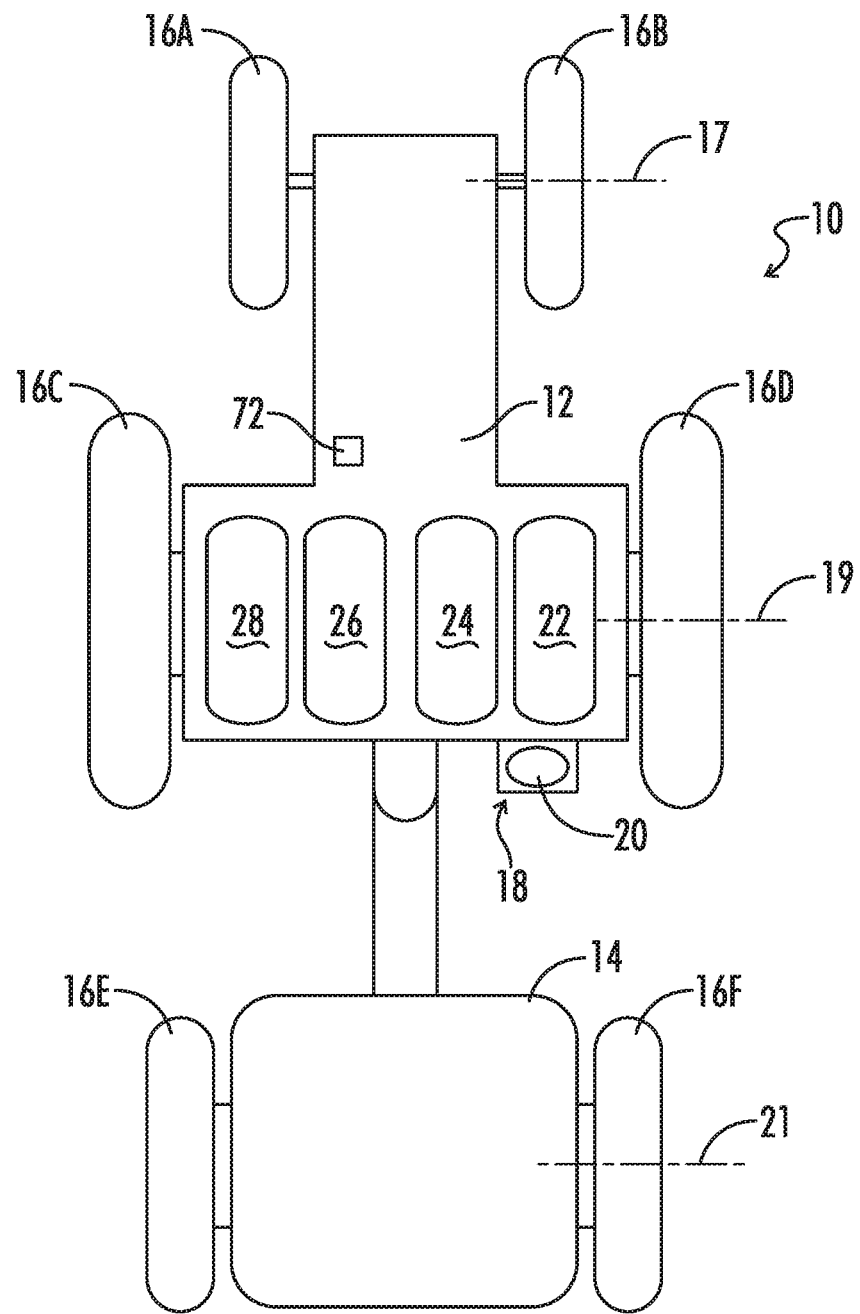
FIG. 1 is a schematic plan view of a vehicle comprising a tractor and a trailer, and including a tire inflation system. The trailer may be an agricultural implement.
Figure 2:
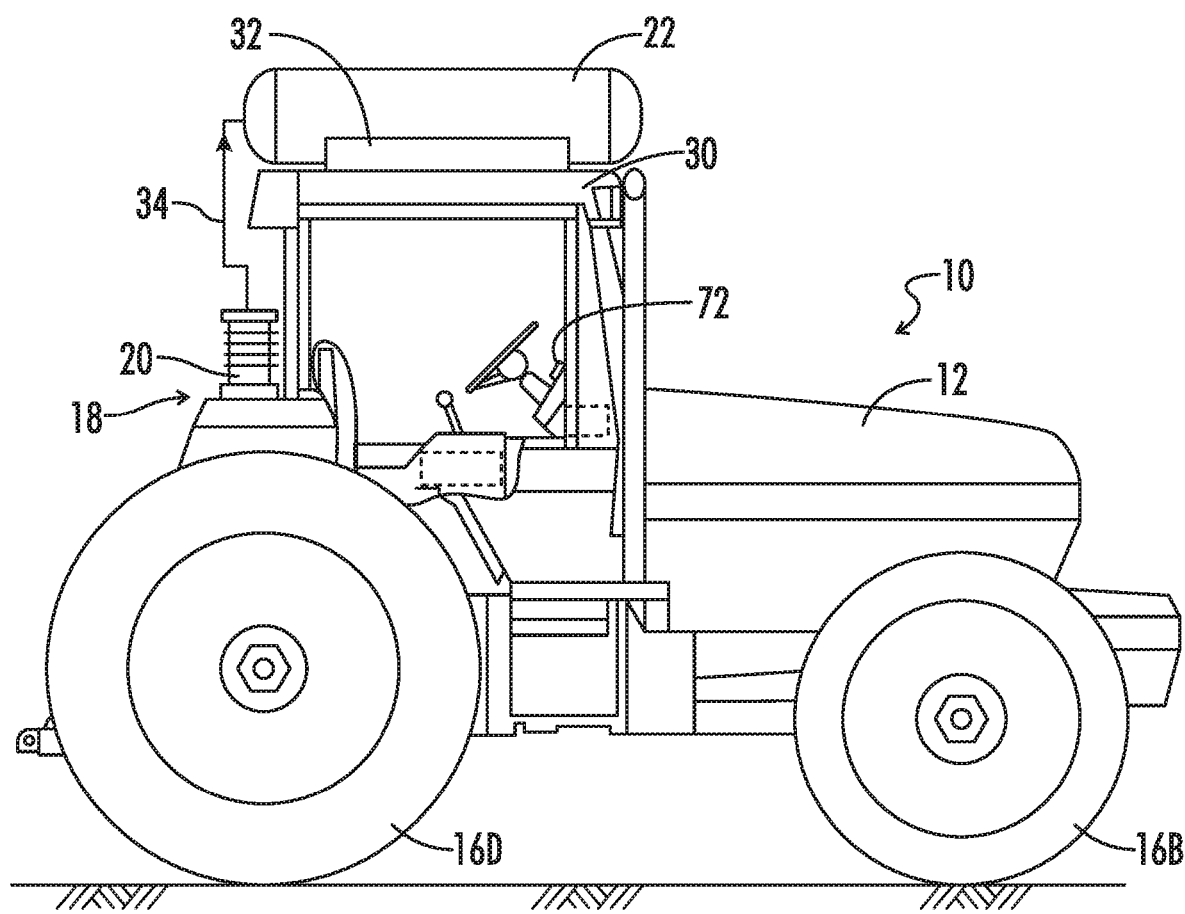
FIG. 2 is a schematic elevation view of the tractor of FIG. 1.

Referring now to FIGS. 1 and 2 a vehicle 10 is shown which may include a tractor 12 and a trailer 14. The trailer 14 may be a trailer for hauling goods, or it may be another agricultural implement including but not limited to freewheeling agricultural implements including corn planters, tillage equipment, disc implements, rippers, field cultivators, air seeders and the like.

The tractor 12 includes first and second front tires 16A and 168 associated with a front axle 17, and first and second rear tires 16C and 16D associated with a rear axle 19. The trailer may include first and second trailer tires 16E and 16F associated with a trailer axle 21. It will be understood that the vehicle 10 may include other arrangements and may include more than the six tires shown or less.

Figure 3:
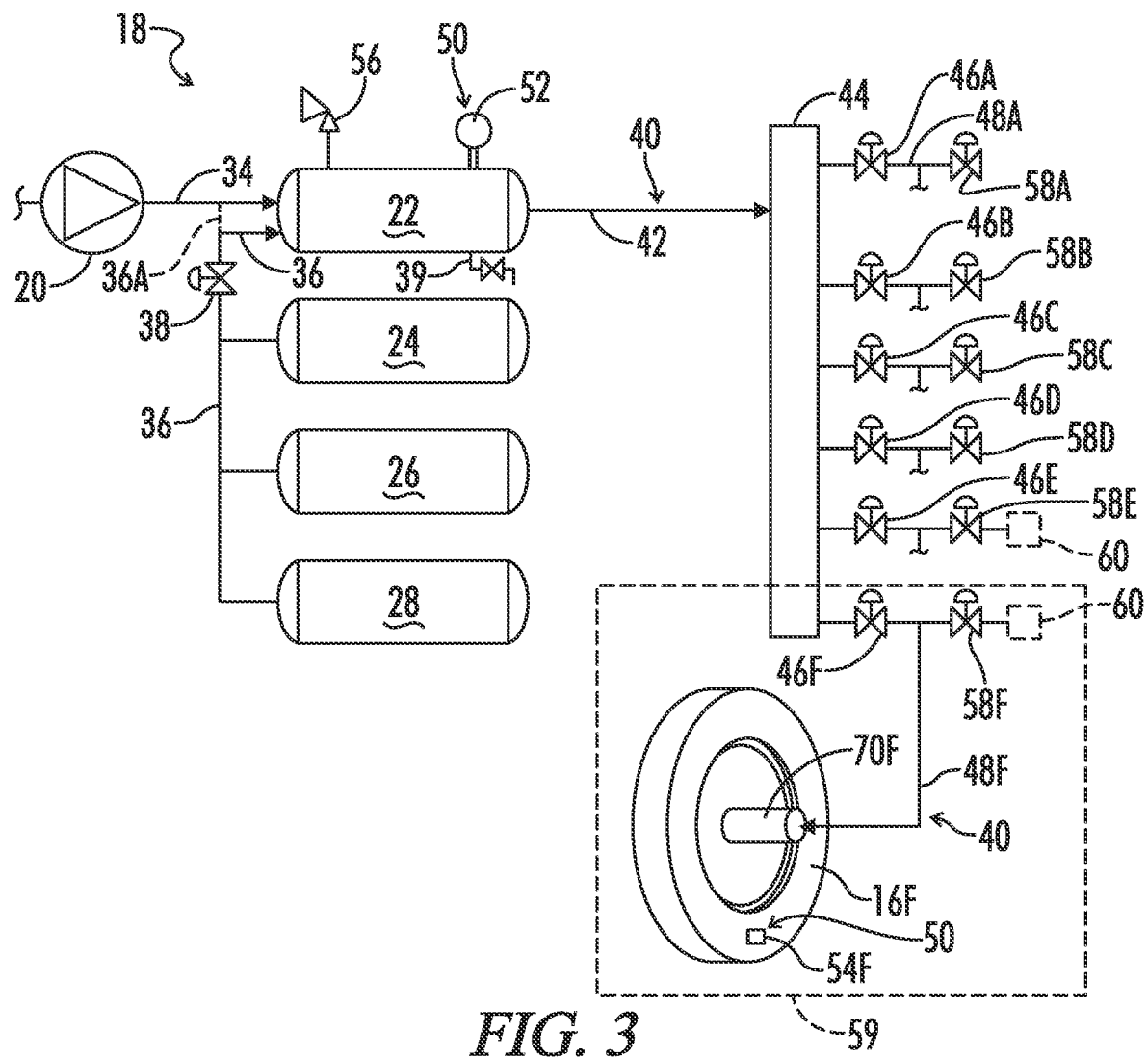
FIG. 3 is a schematic view of the compressor, the air storage tanks, the various supply and inflation lines, the fill and dump valves, and the connection thereof to a representative one of the tires.

A tire inflation system 18 is mounted on the vehicle 10, and is schematically illustrated in FIG. 3. The tire inflation system includes a compressor 20 carried on the tractor 12. A main air storage tank 22 and a plurality of auxiliary air storage tanks 24, 26 and 28 are also carried on the tractor 12. As best seen in FIG. 2, the air storage tanks may be mounted on a roof 30 of the tractor 12 with a mounting bracket 32. A compressed air supply main line 34 communicates the compressor 20 with the main air storage tank 22. A compressed air supply auxiliary line 36 is shown in FIG. 3 to communicate the auxiliary air storage tanks 24, 26 and 28 with the main air storage tank 22. Optionally, as shown in dashed lines at 36A in FIG. 3, the compressed air supply auxiliary line 36 could be connected to the compressed air supply main line 34. In general, the compressed air supply auxiliary line can be described as being communicated with at least one of the compressed air supply main line 34 and the main air storage tank 22.

An automated shut off valve 38 is disposed in the compressed air supply auxiliary line 36.

A condensate drain 39 may also be provided on each of the tanks as shown in FIG. 3 for main storage tank 22.

An inflation air line 40 communicates the main air storage tank 22 with at least one of the tires 16A-16F. The inflation air line 40 may be described as including an inflation air main line 42 which connects the main air storage tank 22 to a manifold 44.

In the embodiment illustrated in FIG. 3, the inflation air main line 42 is illustrated as comprising one and only one tubular conduit 42 communicating the main air storage tank 22 with the manifold 44. Optionally, in some embodiments the inflation air main line 42 could comprise multiple tubular conduits communicating one or more storage tanks with the manifold 44, or with multiple manifolds associated with the various fill valves.

A plurality of automatically operable fill valves 46A-46F are connected to the manifold 44. Each fill valve is communicated with a respective one of the tires 16A-16F by a separate inflation air branch line 48A-48F. The inflation air branch lines 48A-48F may be considered part of the inflation air line 40.

An inflation pressure sensor 50 is arranged to detect an inflation pressure provided to the at least one of the tires 16A-16F. In one embodiment, the inflation pressure sensor 50 includes a tank pressure gauge 52 communicated with the main air supply tank 22 or optionally communicated with the inflation air main line 42. Optionally, the inflation pressure sensor 50 may include a plurality of tire pressure sensors 54A-54F, each of the tire pressure sensors 54 being disposed in one of the tires 16A-16F, with each tire pressure sensor configured to wirelessly transmit pressure data. The tire pressure sensors 54 may be conventional Tire Pressure Monitoring System (TPMS) sensors.

The inflation air branch lines such as 48F communicate air to their associated tires such as 16F via rotary unions such as union 70F schematically illustrated in FIG. 3.

Preferably, the rotary unions 70 are communicated with the interior cavities of their respective tires 16 via a pilot type inflation valve. Such valves communicate with two pneumatic circuits of the rotary union 70. A large bore circuit provides a flow path for inflation air, and a smaller bore circuit supplies pilot air pressure to a pilot valve of the inflation valve. The pilot valve is located in the inflation valve and acts to separate the tire cavity from the outside. When the pilot circuit is unpressurized, the inflation valve is closed and the tire 16 cannot leak through the inflation valve plumbing. Pressurizing the pilot valve of the inflation valve forces the inflation valve to open so that the tire cavity is connected to the inflation path through the rotary union 70. The advantage of this arrangement is that the tire cannot leak due to damage to the pressure tubing and the rotary union 70 can remain unpressurized most of the time, thus improving seal life. Such pilot actuated inflation valves are particularly useful when using internal TPMS sensors such as 54A-54F.

Thus, each of the fill valves 46A-46F is communicated with the main air storage tank 22 through the manifold 44 and the inflation air main line 42, and each fill valve is communicated with its respective tire by one of the separate inflation air branch lines 48A-48F.

A pressure relief valve 56 may be mounted on the main air storage tank 22.

In FIG. 3, the details of the valving associated with tire 16F are schematically illustrated within the dashed box 59. The details associated with the valving corresponding to each of the other tires is similarly constructed. As noted, the fill valve 46F is an automated fill valve and it communicates its associated tire 16F with the main air storage tank 22 when the fill valve 46F is in an open position. The fill valve 46F may be a solenoid operated valve having an open position and a closed position. The fill valve 46F may be described as a non-throttling on-off valve selectively movable between a discrete open position and a discrete closed position.

Also associated with each of the tires is an automatically operable dump valve 58A-58F, respectively. Each of the dump valves such as 58F may also be a separate solenoid operated valve which may be described as a non-throttling on-off valve selectively movable between a discrete open position and a discrete closed position. One example of valves suitable for use as fill valves 46A-F and dump valves 58A-F is an Air Engine 4F valve available from AirBagIt.com. Each of the dump valves such as 58F is connected to its associated inflation air branch line such as 48F between its associated fill valve 46F and tire 16F. The dump valve 58F is also communicated with an open exhaust zone 60 which may for example be the atmosphere.

Thus, when fill valve 46F is open and dump valve 58F is closed, compressed air may be provided to the tire 16F to further inflate the same from the compressed air storage tank 22. To deflate the tire 16F, the fill valve 46F is closed and the dump valve 58F is opened.

Thus, each of the tires 16A-F is associated with a respective one of the dump valves 58A-58F, so that each tire is vented to an open exhaust zone 60 to decrease inflation pressure in the tire when its respective dump valve 58A-58F is in an open position.

Figure 4:
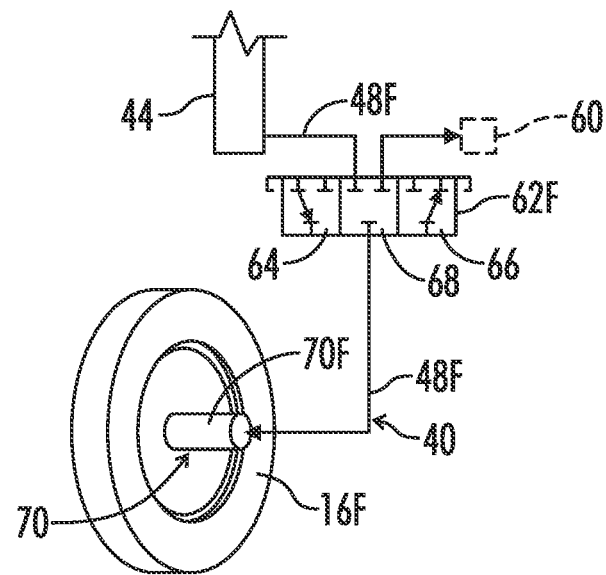
FIG. 4 is a schematic illustration, similar to that portion of FIG. 3 contained in dashed lines, illustrating an alternative embodiment for the fill and dump valves. In the embodiment of FIG. 4 a single three-way valve replaces the separate fill valve and dump valve arrangement of FIG. 3.

FIG. 4 shows an alternative version of the structure within the dashed box 59 of FIG. 3, in which a single three-way valve 62F has been substituted for the arrangement of separate fill valve 46F and dump valve 58F described above regarding FIG. 3.

In FIG. 4, the three-way valve 62F is illustrated schematically as having an open position 64 in which the manifold 44 is communicated with the tire 16F, a dump position 66 in which the respective tire 16F is vented to open exhaust zone 60 to decrease inflation pressure in the tire, and a blocked position 68 in which there is no flow of air to or from the tire 16F through the three-way valve 62F.

The Control System

Figure 5:
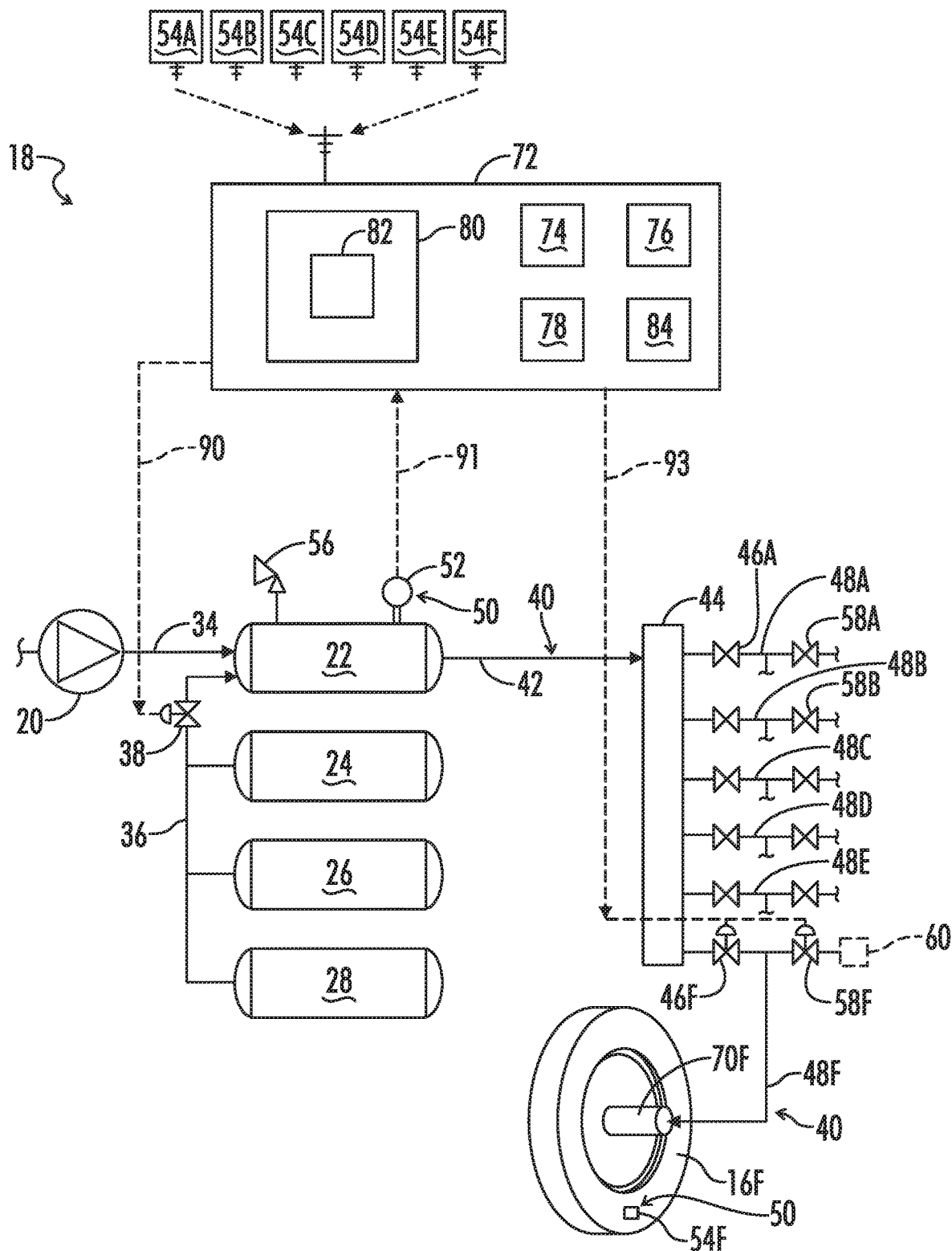
FIG. 5 is a schematic illustration of the controller and its interconnection with the various sensors and control valves of FIG. 3.

Referring now to FIG. 5, a control system for the tire inflation system 18 is schematically illustrated. A controller 72 is operably associated with all of the fill valves 46A-46F, the dump valves 58A-58F, the automated shut off valve 38, and various other components of the tire inflation system 18.

Controller 72 includes a processor 74, a computer readable memory medium 76, a data base 78 and an input/output module or control panel 80 having a display 82.

The term "computer-readable memory medium" as used herein may refer to any non-transitory medium 76 alone or as one of a plurality of non-transitory memory media 76 within which is embodied a computer program product 84 that includes processor-executable software, instructions or program modules which upon execution may provide data or otherwise cause a computer system to implement subject matter or otherwise operate in a specific manner as further defined herein. It may further be understood that more than one type of memory media may be used in combination to conduct processor-executable software, instructions or program modules from a first memory medium upon which the software, instructions or program modules initially reside to a processor for execution.

"Memory media" as generally used herein may further include without limitation transmission media and/or storage media. "Storage media" may refer in an equivalent manner to volatile and non-volatile, removable and non-removable media, including at least dynamic memory, application specific integrated circuits (ASIC), chip memory devices, optical or magnetic disk memory devices, flash memory devices, or any other medium which may be used to stored data in a processor-accessible manner, and may unless otherwise stated either reside on a single computing platform or be distributed across a plurality of such platforms. "Transmission media" may include any tangible media effective to permit processor-executable software, instructions or program modules residing on the media to be read and executed by a processor, including without limitation wire, cable, fiber-optic and wireless media such as is known in the art.

The term "processor" as used herein may refer to at least general-purpose or specific-purpose processing devices and/or logic as may be understood by one of skill in the art, including but not limited to single- or multithreading processors, central processors, parent processors, graphical processors, media processors, and the like.

The controller 72 receives input data from the various sensors such as tank pressure sensor 52 and the various tire pressure sensors 54A-54F, all of which are schematically shown in FIG. 5. The controller may receive various other inputs regarding other operating parameters of the vehicle 10.

Based upon various operational modes which may be defined by the computer programming product 84 the controller 72 generates various control signals which may be communicated to the automated shut off valve 38, the automated fill valves 46A-46F, and the automated dump valves 58A-58F as schematically illustrated via dashed communication lines 90, 91 and 93 in FIG. 5. Any of the communication lines 90, 91 and 93 may be hard wired or they may be wireless communication.

In order to provide for rapid inflation of the tires, two sources of compressed air are provided, namely the compressed air tank system including main air storage tank 22 and auxiliary storage tanks 24, 26 and 28, and a second air source, namely the compressor 20.

Depending upon the relative volumes of the tires, the tank system, and the output capacity of the compressor, the relative portions of the tire filling capacity provided by the stored compressed air in the tank system as compared to the additional compressed air provided over time from the compressor will vary.

For a given set of tires, and for a desired fill time between a given low pressure and high pressure, the selection of storage tank capacity and compressor output rate will determine the relative contributions to inflation capabilities from the stored compressed air and the additional compressed air.

Typically, the initial inflation boost provided from stored compressed air when the fill valves 46A-46F are open will equalize with the tires within a few seconds, and then the additional time required for the compressor to bring the inflation pressure up to the desired final pressure will depend on the output rate of the compressor 20.

The tire inflation system 18 described above is particularly well adapted for a rapid inflation of tires from a low pressure level to a high pressure level, such as for example to increase the inflation pressure of the tires of an agricultural vehicle from the low pressure level at which it preferably operates in the agricultural field, to a higher pressure level suitable for moving the agricultural vehicle along the public highways to a different location. To that end, the controller 72 can be operated in any one of several different operational modes which take advantage of the functional features of the tire inflation system 18 described above in order to increase the speed at which a given system can inflate the tires of an agricultural vehicle. Several such modes of operation are described below, emphasizing various features of the tire inflation system 18. These various modes may be used individually or in combination. In general all of the modes described below can be described as rapid inflation modes, and each takes advantage of the ability of the system 18 to initially communicate stored compressed air from a storage tank to the tire or tires being inflated to raise the pressure in the tires from an initial level to an intermediate level, and to subsequently continue to increase the pressure in the tires from the intermediate level achieved with the stored compressed air to a final level achieved with the assistance of additional compressed air coming from the compressor 20.

Rapid Inflation Mode 1—Isolation of Auxiliary Storage Tanks

A first rapid inflation mode takes advantage of the presence of the automated shut off valve 38 in the compressed air supply auxiliary line 36, and its ability to isolate the auxiliary compressed air storage tanks 24, 26 and 28 from the compressor 20 after those auxiliary storage tanks have been utilized to initially boost the inflation pressure of the tire or tires being inflated.

Figure 6:
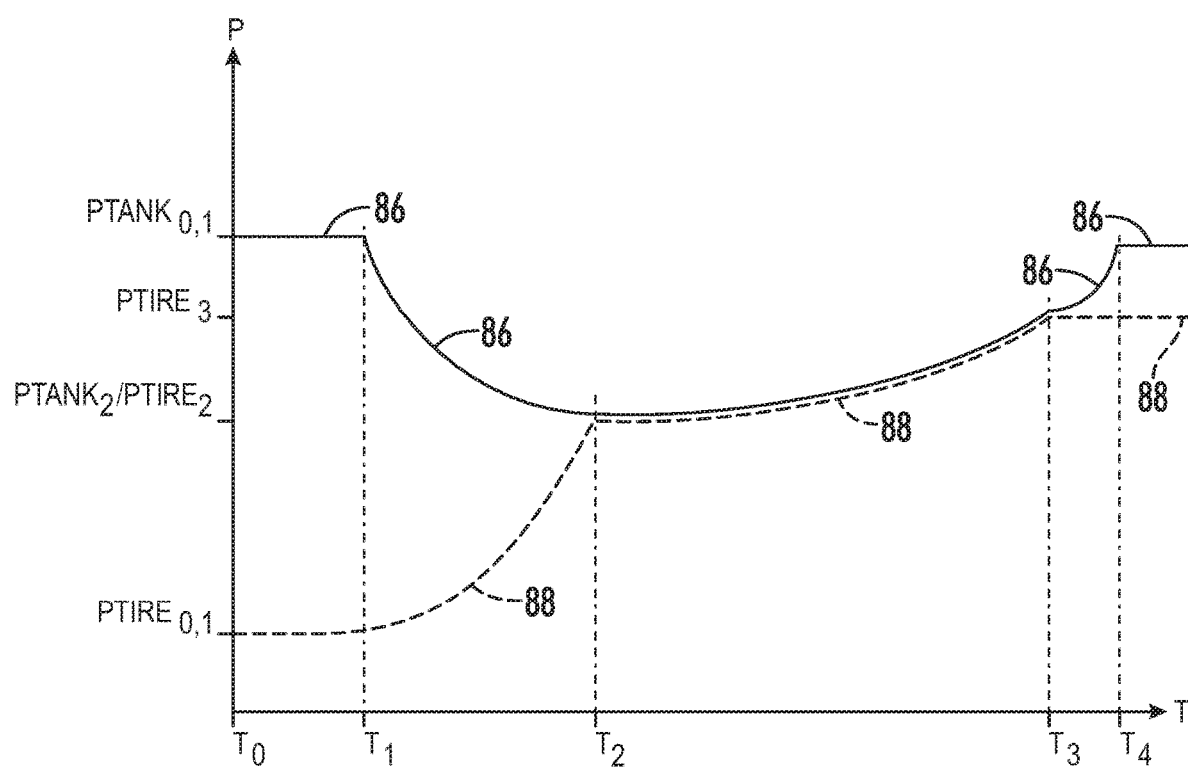
FIG. 6 is a graphical representation of air pressures stored in the air storage tank and of inflation pressure provided to the tires as a function of time.

FIG. 6 is a graphical representation of this rapid inflation mode and it shows time on the horizontal scale and pressure on the vertical scale. The solid line curve is representative of the pressure in the main storage tank 22, and the dashed line curve is representative of the pressure in the tire or tires 16 being inflated.

Beginning at time $T_0$ the pressure in the tire or tires being inflated is represented as $PTIRE_{0,1}$ and that pressure is at the low pressure level for the tires at which they would be operating in the agricultural field. At time $T_0$ the pressure in the main storage tank 22 is at $PTANK_{0,1}$ which is the storage pressure in the tank 22 and also within the auxiliary tanks 24, 26 and 28. The pressure in the storage tanks and particularly main storage tank 22 may be monitored by the tank pressure sensor 52 which communicates with the controller 72.

If separate TPMS sensors 54A-54F are used, the controller 72 may be configured to receive pressure data from the tire pressure sensors 54 and to use that as an indication of both tank pressure and tire pressure instead of the signals from tank pressure sensor 52. Furthermore, the controller 72 may base its actions on a combination of the pressure signals from tank pressure sensor 52 and tire pressure sensors 54.

At time $T_0$, the automated shut off valve 38 is open so that the storage capacity of auxiliary compressed air tanks 24, 26 and 28 is added to that of the main compressed air storage tank 22 to define a storage volume of the storage tank system comprised of all of the operable storage tanks combined.

At time $T_1$ one or more of the fill valves 46A-46F are opened to communicate the storage tank system with one or more of the tires 16A-16F to be inflated. In a relatively short interval of time, such as for example a few seconds, in the time interval from $T_1$ to $T_2$, the pressure in the tank storage system will drop and the pressure in the tire or tires being inflated will rise until they are substantially equalized at a pressure shown as $PTANK_2/PTIRE_2$ at time $T_2$. During this operation, the compressor 20 will be on and will be adding additional air to the compressed air storage tank system. Once the pressure in main storage tank 22 and the tire or tires being inflated equalizes, then the pressure in both the storage tank system and the tires will begin to gradually increase as seen in both the solid line curve 86 and the dashed curve 88 to the right of time $T_2$.

The controller 72 is monitoring the pressure in the tank 22 via tank pressure sensor 52 and can determine when the pressure in tank 22 has reached its lowest level and has begun to increase, indicating that the low point in the curve 86 has been reached. At that time, the controller 72 sends a control signal to automated shut off valve 38 via control line 90 seen in FIG. 5 to close the valve 38 thereby isolating the auxiliary tanks 24, 26 and 28 from the compressor 20 while the compressor 20 continues to provide additional compressed air to the main storage tank 22 and thus to the tire or tires being inflated.

By isolating the auxiliary storage tanks 24, 26 and 28, which may be described as a majority portion of the storage volume of the tank system, the speed with which the tire or tires being inflated can be raised to their desired final pressure $PTIRE_3$ is increased, because the compressor 20 is not required to raise the pressure within the auxiliary storage tanks to the higher pressure level.

Thus again with reference to FIG. 6, the tank storage pressure shown by curve 86 and the tire inflation pressure shown by dashed curve 88 will more gradually rise and remain substantially equal as shown in FIG. 6 from time $T_2$ to time $T_3$.

At time $T_3$, when the controller 72 detects that the pressure $PTIRE_3$ has been achieved in the tire or tires being inflated, then the operative fill valves 44A-46F will be closed, and the shut off valve 38 will be reopened, so that the compressor 20 may repressurize the entire tank system including main tank 22 and auxiliary tanks 24, 26 and 28 back to the tank storage pressure $PTANK_{0,1}$. This is schematically represented by the portion of solid line curve 86 between times $T_3$ and $T_4$ in FIG. 6.

In one aspect, the rapid inflation mode just described with regard to FIG. 6 can be described as being performed by the controller 72 having a rapid inflation mode configured to initially communicate stored compressed air from both the main air storage tank 22 and the auxiliary storage tanks 24, 26 and 28 to the tire or tires 16 being inflated, and to then close the automated shut off valve 38 so that additional compressed air from the compressor 20 is communicated to the tire or tires being inflated without repressurizing the auxiliary air storage tanks 24, 26 and 28.

This can also be described as closing the automated shut off valve 38 after pressure in the main air storage tank 22 and the tire or tires being inflated substantially equalizes as shown by the intersection of curves 86 and 88 at time $T_2$ in FIG. 6.

As previously noted, the controller 72 includes an input/output module 80, which may be more generally described as an input device configured such that a human operator can enter a low pressure setting such as the pressure $PTIRE_{0,1}$ in FIG. 6, and a high pressure setting such as the pressure $PTIRE_3$ in FIG. 6, into the controller 72. Thus the rapid inflation mode of controller 72 just described is configured such that the automated shut off valve remains closed and the fill valves 46 associated with the tire or tires being inflated remain open, until the inflation pressure in the tire or tires being inflated reaches the high pressure setting $PTIRE_3$.

It is noted that in the system illustrated in FIG. 4, the closure of the automated shut off valve 38 isolates the auxiliary tanks from the compressor 20, but the compressor 20 still communicates with the tire 16 via the main storage tank 22. Although it is possible in an alternative embodiment of the invention to also have the compressor 20 also bypass the main compressed air storage tank 22, it is generally preferable to keep some storage capacity as represented by the main air storage tank 22 in order to provide some surge protection to the pneumatic system and to prevent short cycling of the compressor 20 on and off as it seeks to maintain a desired pressure in the inflation line 40. Thus, additional inflation air provided to the tire or tires 16 after the initial inflation boost provided from the compressed air in the storage tank system, is still provided through the main storage tank 22 which may be described as being at least a portion of the compressed air storage tank system.

Methods of Performing the Rapid Inflation Mode 1

The methods involved in using Rapid Inflation Mode 1 just described may be described as follows:

(a) providing on the vehicle 10 the compressed air tank system 22, 24, 26, 28 for storing compressed air, the tank system defining a storage volume;

(b) providing on the vehicle 10 the air compressor 20;

(c) storing compressed air from the compressor 20 in the tank system 22, 24, 26, 28 at a storage pressure $PTANK_{0,1}$;

(d) increasing an inflation pressure of at least one of the tires 16A-16F from an initial tire inflation pressure $PTIRE_{0,1}$ to an intermediate tire inflation pressure $PTIRE_2$ by communicating the tank system 22, 24, 26, 28 with the tire or tires 16A-16F being inflated; and (e) further increasing the inflation pressure of the tire or tires being inflated from the intermediate tire inflation pressure $PTIRE_2$ to a final tire inflation pressure $PTIRE_3$ with additional air from the compressor 20 while isolating at least a portion of the storage volume of the tank system, in this case the volume of auxiliary tanks 24, 26 and 28, from communication with the compressor 20.

The method may further include, after step (e), isolating the tire or tires 16A-16F which were being inflated, from the tank system 22, 24, 26 and 28, then communicating the entire storage volume of all of the tanks 22, 24, 26, 28 of the tank system with the compressor 20 and repressurizing the entire storage volume to the storage pressure $PTANK_{0,1}$.

In the method, during step (d), the pressure in tank 22 may be monitored with tank pressure sensor 52, and the isolation of the storage volume of auxiliary tanks 24, 26 and 28 by closing valve 38 may be performed after the monitored pressure in the tank system has reached a lowest pressure and begins to rise as shown by the lowest inflection point on the solid line curve 86 in FIG. 6.

As is apparent in FIG. 6, the lowest pressure that occurs in the tank system is substantially equal to the intermediate tire inflation pressure, which pressures are indicated as $PTANK_2$ and $PTIRE_2$ in the example of FIG. 6.

In addition to monitoring pressure in the tank system via tank pressure sensor 52, it may also be desired during the inflation process to directly monitor the inflation pressure in one or more of the tires 16 in real time while increasing the inflation pressure. This may be performed, for example, with a respective one of the tire pressure sensors 54 schematically illustrated in FIGS. 4 and 5, which as noted above may be TPMS sensors which communicate wirelessly with the controller 72 as schematically illustrated in FIG. 5.

It is noted that the final tank pressure at time T4 is represented in FIG. 6 as being equal to the initial tank pressure $PTANK_{0,1}$ which has previously been described as the tank storage pressure. Although the tank storage pressure is shown as being equal at the beginning and the end of the example in FIG. 6, it is not necessary for the tank storage pressure to always be a constant value. It may be changed as desired.

It is also noted that in the example of FIG. 6, the storage pressure in the tank system as represented by $PTANK_{0,1}$ is higher than the high inflation pressure setting $PTIRE_3$, which in turn is higher than the intermediate tire inflation pressure $PTIRE_2$, which is in turn higher than the low pressure setting $PTIRE_{0,1}$.

By isolating a substantial portion of the storage volume of the storage tank system by closing valve 38 at time $T_2$, the time interval between time $T_2$ and $T_3$ to raise the inflation pressure of the tire or tires being inflated to the desired final level $PTIRE_3$ will be shorter than it would be if the valve 38 remained open thus requiring repressurization of the entire storage volume of the tank system to pressure $PTIRE_3$.

Rapid Inflation Mode 2—Multiple Tire or All Tire Inflation

First it is noted that the multiple tire or all tire rapid inflation mode described below may be utilized either alone or in combination with the Rapid Inflation Mode 1 feature described above, namely the use of the automated shut off valve 38 to selectively isolate the auxiliary tanks after they have been discharged.

As previously noted, in the example shown in FIG. 1, the vehicle 10 includes two front tractor tires 16A and 16B, two rear tractor tires 16C and 16D, and two trailer tires 16E and 16F.

In some situations it will be desirable to inflate multiple ones of the tires simultaneously, or all of the tires simultaneously. For example, in one embodiment it might be desired to inflate only the front tractor tires 16A and 16B.

In another embodiment it might be desired to inflate only the rear tractor tires 16C and 16D.

In another embodiment it might be desired to inflate all of the tractor tires 16A-16D.

In another embodiment it might be desired to inflate the trailer tires 16E and 16F.

In another embodiment it might be desired to inflate all six tires 16A-16F together.

As previously noted, one scenario for use of the vehicle 10 with the tire inflation system 18 described herein is to increase the inflation pressure of all of the tires 16A-16F from a low pressure setting in which they are typically used in an agricultural field to a higher pressure setting in which they are typically run along the public roads. Similarly, upon reentering another agricultural field, it may be desirable to simultaneously deflate all of the tires from the higher pressure setting back to the lower pressure setting which is further described below.

There are many other situations, in which it may be desirable to change the inflation pressure of one or more of the tires. For example if the trailer 14 is carrying a variable load, it may be desired to increase the inflation pressure of the tires 16E and 16F as the load on the trailer 14 increases, and to decrease the inflation pressure in the tires 16E and 16F as the weight decreases.

Another situation which might create a need for a change in inflation pressure is a change in soil conditions in the field being treated.

In any of the situations suggested above, and many others, it may be desired to simultaneously inflate two or more of the tires 16A-16F together.

In such a multiple tire rapid inflation mode, the fill valves 46 associated with two or more of the tires 16 are maintained in their open positions for an initial period until pressure in the air storage tank system and the tires being inflated substantially equalizes, and for a subsequent period during which the compressor 20 provides additional inflation air to the tires being inflated.

This multiple tire rapid inflation mode may be utilized in conjunction with the use of the shut off valve 38 to isolate a portion of the compressed air storage tank system, or it may be used with a compressed air storage tank system of constant volume.

Methods of Implementation of Multiple Tire or all Tire Rapid Inflation Mode

The methods of operation utilizing the multiple tire or all tire rapid inflation mode just described above may also be described with regard to the schematic graphical representation of FIG. 6.

Such a method of rapid inflation of a plurality of tires 16 of the vehicle 10 may comprise steps of:

(a) providing on the vehicle 10 a compressed air tank system 22, 24, 26, 28;

(b) providing on the vehicle 10 an air compressor 20;

(c) providing the plurality of automated fill valves 46A-46F, each fill valve being associated with a respective one of the tires 16A-16F so that each tire can be communicated with the air tank system via a separate one of the fill valves;

(d) storing compressed air from the compressor 20 in the air tank system 22, 24, 26, 28 at a storage pressure $PTANK_{0,1}$; and (e) under control of a multiple tire rapid inflation mode of the controller 72, opening the respective fill valves 46 associated with the tires to be inflated and maintaining the respective fill valves 46 associated with the tires being inflated in their open positions during an initial period from $T_1$ to $T_2$ until pressure in the air tank system and the tires being inflated substantially equalizes at $PTANK_2/PTIRE_2$ at time $T_2$ as seen in FIG. 6, and continuing to maintain those fill valves in their open position during a subsequent period from time $T_2$ to $T_3$ during which the compressor 20 provides additional compressed air to the tires being inflated.

Once the inflation pressure in the plurality of tires being inflated reaches the desired upper setting $PTIRE_3$, then the fill valves 46 associated with the tires being inflated are closed and the compressor 20 continues to repressurize the tank system until the pressure in the tank system reaches again the storage pressure $PTANK_{0,1}$ as schematically illustrated in FIG. 6.

Rapid Deflation Mode

As previously noted, each of the tires 16A-16F has associated therewith a respective dump valve 58A-58F. When the dump valve 58 associated with a given one of the tires is opened, it communicates the interior of the tire with an open exhaust zone 60 which may for example be atmospheric pressure.

It will be appreciated that due to the difference in size of some of the tires 16 as compared to others of the tires, and also because the tires may be at differing inflation pressures, even if all of the dump valves 58 are opened simultaneously to decrease the pressure in their respective tires, each tire may reach the desired lower pressure setting such as $PTIRE_{0,1}$ after a different elapsed time. Thus, in the rapid deflation mode it is preferable to individually monitor the pressure in each tire such as through the tire pressure sensors 54 and then to close each separate one of the dump valves 58A-58F when the inflation pressure in its respective tire drops to a desired low pressure level.

Thus, the controller 72 may be described as having an all tire rapid deflation mode in which all of the dump valves 58A-58F are initially in their open positions, and each separate dump valve 58A-58F is closed when the inflation pressure in its respective tire drops to a set low pressure such as for example $PTIRE_{0,1}$.

Manual Mode

The modes of operation described above may be referred to as automatic modes. In these automatic modes the human operator may enter an instruction in controller 72 to switch from the high pressure setting to the low pressure setting or from the low pressure setting to the high pressure setting, and the controller 72 will operate the various valves to accomplish the change.

Additionally, the controller 72 may include a manual mode in which the human operator may select any one of the fill valves 46 or dump valves 58 to be operated to separately inflate or separately deflate any selected one of the tires 16.

Selection of Components

To select and properly size the various components of the tire inflation system 18, a typical approach may be as follows.

First, the problem being addressed can be defined by determining the volume of the tires 16 which are to be inflated, the desired low pressure and high pressure settings of the tires, and the desired minimum inflation time within which it is necessary to inflate the tires from the low pressure setting to the high pressure setting.

Then, the two component choices which most affect the operation of the tire inflation system 18 and the time intervals depicted in FIG. 6, are the choice of the storage tank volume and the choice of the compressor 20 and its associated output rate.

The larger the storage volume of the compressed air storage tank system 22, 24, 26 and 28, the higher the intermediate pressure $PTIRE_2$ will be and the less additional pressurization will be necessary from the compressor 20.

It will be appreciated that generally speaking, the increase in pressure from $PTIRE_{0,1}$ to $PTIRE_2$, which is the time between $T_1$ and $T_2$, will typically be very short on the order of a few seconds. The subsequent time interval from $T_2$ to $T_3$ to achieve the final tire inflation pressure $PTIRE_3$ will typically be substantially longer than the interval from $T_1$ to $T_2$. The time from $T_2$ to $T_3$ will depend upon the additional pressure which must be provided from the compressor 20 and the output rate of the compressor 20 which determines how quickly it can achieve the desired final pressure within the entire volume of the plurality of tires being inflated.

There is of course an associated cost of large storage tank systems and of large compressor output capacities, along with related logistical problems of having sufficient room for the storage tank system and related equipment on the tractor 12.

If an expensive, large capacity compressor 20 is selected, then the need for a large capacity compressed air storage tank system is reduced. On the other hand, if a large capacity compressed air storage tank system is provided, then a smaller and less expensive compressor system may be selected and still provide inflation within acceptable time limits.

Other factors which will affect the performance of the tire inflation system may include the following.

In general, all components including piping, fittings, valving and the like should be selected so as to reduce flow restriction as much as possible.

It is preferable if the fill valves 46 and the dump valves 58 are high capacity quickly opened and closed valves such as solenoid actuated on/off type valves.

Of particular importance is the selection of the inflation air line 40, 42 and manifold 44 so that there is very low flow restriction between the compressed air storage tank system and the fill valves 46, and the selection of low flow restriction inflation air branch lines 48 between the fill valves 46 and their respective tires 16.

In general, the components may be selected to provide a tank equalization time from $T_1$ to $T_2$ of 10 seconds or less and a total inflation time from $T_1$ to $T_3$ of less than 10 minutes, preferably less than 5 minutes, and more preferably less than about one minute.

The components may also be selected to provide for changes between a field ready low pressure and a road ready high pressure in the following ranges. A field ready pressure in which the tire 10 is pressurized at a relatively low pressure so as to be utilized in a field and to reduce the compaction of the field by the tire, may comprise a pressure in a range of from 4 psi to 16 psi. A road ready pressure, on the other hand, will be at a relatively higher level which may for example involve inflating the tires to a road ready pressure in a range of from 20 psi to 40 psi. The preferred field ready pressures and road ready pressures above may be described as a field ready pressure that is in a range of from 20% to 50% of the road ready pressure, and more preferably wherein the field ready pressure is in a range of from 25% to 40% of the road ready pressure.

EXAMPLE

One example of a tire inflation system 18 constructed in accordance with FIG. 3 utilizes four compressed air storage tanks 22, 24, 26 and 28 each having a capacity of 20 gallons. The rotary unions 70C and 70D used with the rear tractor tires 16C and 16D may be of the type which runs air tubing down the axle housing to the rotary union. The outer half of the rotary union is welded to the housing and the inner half of the union is connected to the spinning axle. Such unions are unique because their donut style fits around the axle. Tubing is then run from the spinning side of the rotary union through the wheel to the inlet valve on the wheel. This setup keeps the rotary union protected as it is mounted between the tractor and the wheel, and it is possible because the axle is exposed in that area.

The rotary unions used with the front tractor tires 16A and 16B and the trailer tires 16E and 16F may be of a different style due to the fact that those axles are not exposed. This type of rotary union is mounted outboard on the wheel. The union is mounted to a bracket on the wheel and is therefore the spinning half, with the stationary half of the union connected to the tubing connection to the tractor.

In this example, the low tire pressure setting may be selected as 10 psi and the high tire pressure setting may be selected as 20 psi. The combined tire volume in this example is substantially greater than the 80 gallon volume of the tank system. The storage pressure $PTANK_{0,1}$ selected for the compressed air storage tank system may be in the range of 65 to 70 psi.

With this example, it is possible to rapidly inflate all six tires from a low pressure of 10 psi to a high pressure of 20 psi in about 45 seconds. The time interval from $T_1$ to $T_2$ may be approximately 3 seconds and the time interval from $T_2$ to $T_3$ may be approximately 42 seconds Thus it is seen that the apparatus and methods of the present invention readily achieve the ends and advantages mentioned as well as those inherent therein. While certain preferred embodiments of the invention have been illustrated and described for purposes of the present disclosure, numerous changes in the arrangement and construction of parts and steps may be made by those skilled in the art, which changes are encompassed with the scope and spirit of the present invention as defined by the appended claims.

What is claimed is:

1. A tire inflation system for a vehicle supported by a plurality of inflatable tires, comprising:
a compressor carried on the vehicle;
a main air storage tank;
an auxiliary air storage tank;
a compressed air supply main line communicating the compressor with the main air storage tank;
a compressed air supply auxiliary line communicating the auxiliary air storage tank with at least one of the compressed air supply main line and the main air storage tank;
an automated shut off valve disposed in the compressed air supply auxiliary line;
an inflation air line communicating the main air storage tank with at least one of the tires;
an inflation pressure sensor arranged to detect an inflation pressure provided to the at least one of the tires; and
a controller having a rapid inflation mode configured to:
initially communicate stored compressed air from both the main air storage tank and the auxiliary air storage tank to the at least one of the tires; and
then close the automated shut off valve so that additional compressed air from the compressor is communicated to the at least one of the tires without re-pressurizing the auxiliary air storage tank.

2. The system of claim 1, wherein:
the rapid inflation mode of the controller is configured such that the automated shut off valve closes after pressure in the main air storage tank and the at least one of the tires substantially equalizes.

3. The system of claim 1, wherein:
the inflation pressure sensor is in communication with the main air storage tank.

4. The system of claim 1, further comprising:
an automated fill valve disposed in the inflation air line; and
wherein the rapid inflation mode of the controller is further configured such that the automated fill valve is open to communicate the main air storage tank with the at least one of the tires.

5. The system of claim 4, further comprising:
at least one automated dump valve communicated with the inflation air line, the at least one dump valve having an open position in which the at least one of the tires is vented to decrease inflation pressure.

6. The system of claim 1, further comprising:
at least one automated three-way valve disposed in the inflation air line, the at least one three-way valve having an open position in which compressed air is communicated from the main air storage tank to the at least one of the tires to increase inflation pressure in the at least one of the tires, a dump position in which the at least one of the tires is vented to decrease inflation pressure in the at least one of the tires, and a blocked position in which there is no flow of air to or from the at least one of the tires through the at least one three-way valve.

7. The system of claim 1, wherein:
the inflation pressure sensor comprises a plurality of tire pressure sensors, one of the tire pressure sensors disposed in each of the tires, each tire pressure sensor configured to wirelessly transmit pressure data; and
wherein the controller is configured to receive the pressure data from the tire pressure sensors.

8. The system of claim 1, further comprising:
a plurality of automatically operable fill valves, each of the fill valves communicating the inflation air line with a respective one of the tires; and
wherein the rapid inflation mode of the controller is a multiple tire rapid inflation mode configured to:
initially communicate stored compressed air from both the main air storage tank and the auxiliary air storage tank to at least two of the tires through the inflation air line and the fill valves associated with the at least two tires; and
then close the automated shut off valve while maintaining the fill valves associated with the at least two tires open so that additional compressed air from the compressor is communicated to the at least two tires without re-pressurizing the auxiliary air storage tank.

9. The system of claim 8, wherein:
the rapid inflation mode of the controller is an all tire rapid inflation mode configured to:
initially communicate stored compressed air from both the main air storage tank and the auxiliary air storage tank to all of the tires through the inflation air line and the fill valves; and
then close the automated shut off valve while maintaining all of the fill valves open so that additional compressed air from the compressor is communicated to all of the tires without re-pressurizing the auxiliary air storage tank.

10. The system of claim 8, wherein:
the controller includes an input device configured such that a human operator can enter a low pressure setting and a high pressure setting; and
the rapid inflation mode of the controller is configured such that the automated shut off valve remains closed and the fill valves associated with the at least two tires remain open until the inflation pressure in the at least two tires reaches the high pressure setting.

11. The system of claim 1, wherein:
the controller includes an input device configured such that a human operator can enter a low pressure setting and a high pressure setting; and
the rapid inflation mode of the controller is configured such that the automated shut off valve remains closed until the inflation pressure reaches the high pressure setting.

12. A method of rapid inflation of a pneumatic tire of a vehicle supported by a plurality of inflatable tires, the method comprising:
(a) providing on the vehicle a compressed air tank system for storing compressed air, the tank system defining a storage volume;
(b) providing on the vehicle an air compressor;
(c) storing compressed air from the compressor in the tank system at a storage pressure;
(d) increasing an inflation pressure of at least one of the tires from an initial tire inflation pressure to an intermediate tire inflation pressure by communicating the tank system with the at least one of the tires; and
(e) further increasing the inflation pressure of the at least one of the tires from the intermediate tire inflation pressure to a final tire inflation pressure with additional air from the compressor while isolating at least a portion of the storage volume of the tank system from communication with the compressor.

13. The method of claim 12, further comprising:
after step (e), isolating the at least one of the tires from the tank system, communicating the entire storage volume of the tank system with the compressor, and re-pressurizing the storage volume to the storage pressure.

14. The method of claim 12, wherein:
in step (e) at least a majority of the storage volume is isolated from communication with the compressor.

15. The method of claim 12, further comprising:
during step (d), monitoring pressure in the tank system; and
wherein in step (e), the isolating of the at least a portion of the storage volume is performed after the monitored pressure in the tank system has reached a lowest pressure and begins to rise.

16. The method of claim 15, wherein:
the lowest pressure in the tank system is substantially equal to the intermediate tire inflation pressure.

17. The method of claim 12, further comprising:
during step (e) monitoring inflation pressure of the at least one tire in real time while increasing the inflation pressure.

18. The method of claim 17, wherein:
the monitoring is performed wirelessly by a pressure sensor located in the at least one tire.

19. The method of claim 12, wherein:
steps (d) and (e) are performed under control of a rapid inflation mode of a controller;
the method further comprises inputting a low inflation pressure setting and a high inflation pressure setting into the controller; and
in step (e), the final tire inflation pressure is substantially equal to the high inflation pressure setting.

20. The method of claim 19, wherein:
the storage pressure is higher than the high inflation pressure setting;
the high inflation pressure setting is higher than the intermediate tire inflation pressure; and
the intermediate tire inflation pressure is higher than the low pressure setting.

* * * * *